United States Patent
Gift et al.

(10) Patent No.: US 6,870,472 B2
(45) Date of Patent: Mar. 22, 2005

(54) WARNING SYSTEM FOR DETECTING PRESENCE OF A CHILD IN AN INFANT SEAT

(76) Inventors: Larry E. Gift, 3505 Cade Dr., Fremont, CA (US) 94536; Ann M. Gift, 3505 Cade Dr., Fremont, CA (US) 94536

( * ) Notice: Subject to any disclaimer, the term of this patent is extended or adjusted under 35 U.S.C. 154(b) by 64 days.

(21) Appl. No.: 10/421,028

(22) Filed: Apr. 24, 2003

(65) Prior Publication Data

US 2004/0212488 A1 Oct. 28, 2004

(51) Int. Cl.[7] ................................................ C60Q 1/00
(52) U.S. Cl. ................ 340/457; 340/573.1; 340/573.4; 340/425.5; 340/522; 340/667; 180/273
(58) Field of Search .......................... 340/573.1, 573.4, 340/457, 522, 667, 425.5, 428, 426.28, 666; 200/85 A; 307/9.1, 10.1; 180/271, 273, 290

(56) References Cited

U.S. PATENT DOCUMENTS

| | | | | |
|---|---|---|---|---|
| 5,793,291 A | * | 8/1998 | Thornton | 340/573.1 |
| 6,104,293 A | * | 8/2000 | Rossi | 340/573.1 |
| 6,489,889 B1 | * | 12/2002 | Smith | 340/457 |
| 6,535,137 B1 | * | 3/2003 | Ryan | 340/687 |
| 6,714,132 B2 | * | 3/2004 | Edwards et al. | 340/573.1 |

* cited by examiner

Primary Examiner—Anh V. La

(57) ABSTRACT

An apparatus is provided for warning when a child has been left in an infant car seat within a vehicle and the vehicle's door is opened to accommodate exiting driver. The apparatus includes an occupant detection mechanism for detecting the presence of an occupant within an infant seat located within a vehicle; a light detection component for detecting the state of the vehicle's dome light; a battery which provides power to the apparatus; an alarm which activates when the occupant detection mechanism detects the presence of an occupant within the infant seat and the light detection component detects the vehicles dome light has gone from an "off" state to an "on" state because the driver opened the door to exit vehicle. Components of the apparatus are located within the infant seat and can move from vehicle to vehicle along with the infant seat or from infant seat to infant seat.

10 Claims, 1 Drawing Sheet

WARNING SYSTEM FOR DETECTING PRESENCE OF A CHILD IN AN INFANT SEAT

FIELD OF THE INVENTION

The present invention relates in general to a system for detecting the presence of an automobile occupant. In particular, the invention relates to a portable circuit for generating an alarm when the driver is exiting the vehicle and an infant is present in the infant seat.

BACKGROUND OF THE INVENTION

There have been a number of tragic deaths in which children have been mistakenly left in automobiles after the driver had reached their desired destination and left the vehicle. The deaths have usually been caused by a buildup of excess heat or cold within the vehicle during the absence of the driver. Infants, in particular, are susceptible to dehydration when subjected to the elevated temperatures within an enclosed vehicle, and can easily slip into a comatose state.

One system for preventing children from becoming inadvertently locked within a vehicle is described in U.S. Pat. No. 5,793,291. The system utilizes a motion detector to detect the presence of a child or pet within a located vehicle.

Another system described in U.S. Pat. No. 6,104,293 provides for a warning system that warns when a child is in an infant seat and the vehicle's ignition has been turned off.

In regards to U.S. Pat. No. 5,793,291, this system provides some advantages, particularly in the case of older children that may inadvertently lock themselves in a vehicle while playing and may be actively seeking escape, it fails to protect infants who have been left asleep in their child seats and are not capable of sufficient activity to set off a motion detector. Infants, for example, may become dehydrated during sleep and may drift into a comatose state without ever waking.

In regards to U.S. Pat. No. 6,104,293, the preferred system embodiment illustrates the use of a "hard" wire connection into the vehicles electrical system which could void the electrical warranty for that vehicle and even cause an airbag to malfunction if the aftermarket components cause a short circuit, even if this system could be made wireless it would still require the vehicle to have an ignition system in order to work which many of today's new cars no longer have and today's electric cars don't have. This system also triggers a lot of unnecessary alarms every time the engine is shut off at a full service gas station, in the car wash, drive through etc.

It is therefore an object of the invention to remind the vehicle's driver to remove the infant from the car.

It is another object of the invention to be completely portable so the infant reminder circuit can be moved easily from vehicle to vehicle along with the infants car seat or removed from the infants car seat and placed into another infant car seat.

SUMMARY OF THE INVENTION

In accordance with the present invention, there is provided an infant reminder warning when a child has been left in an infant car seat within a vehicle. When the vehicle's door is opened to accommodate exiting driver the infant reminder activates an audible and/or visual alarm. The alarm is activated by a light detection component for detecting the state of the vehicle's dome light; the light detection component detects the vehicles dome light has gone from an "off" state to an "on" state caused by the exiting driver opening his door; a 9 volt battery provides power to the portable infant reminder circuit; when the occupant detection mechanism detects the presence of an occupant within the infant seat and the vehicle's dome light is in the "on" state an alarm will sound. The components of the portable infant reminder circuit are located within the infant seat and are completely portable having only three adhesive backed Velcro attachment points, one on the base of the circuit board, one on the bottom of the occupant detection pressure switch and one that allows the light detection component to attatch to the exterior lens of any vehicle's dome lamp.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DESCRIPTION OF THE PREFERRED EMBODIMENT

Figure 1:
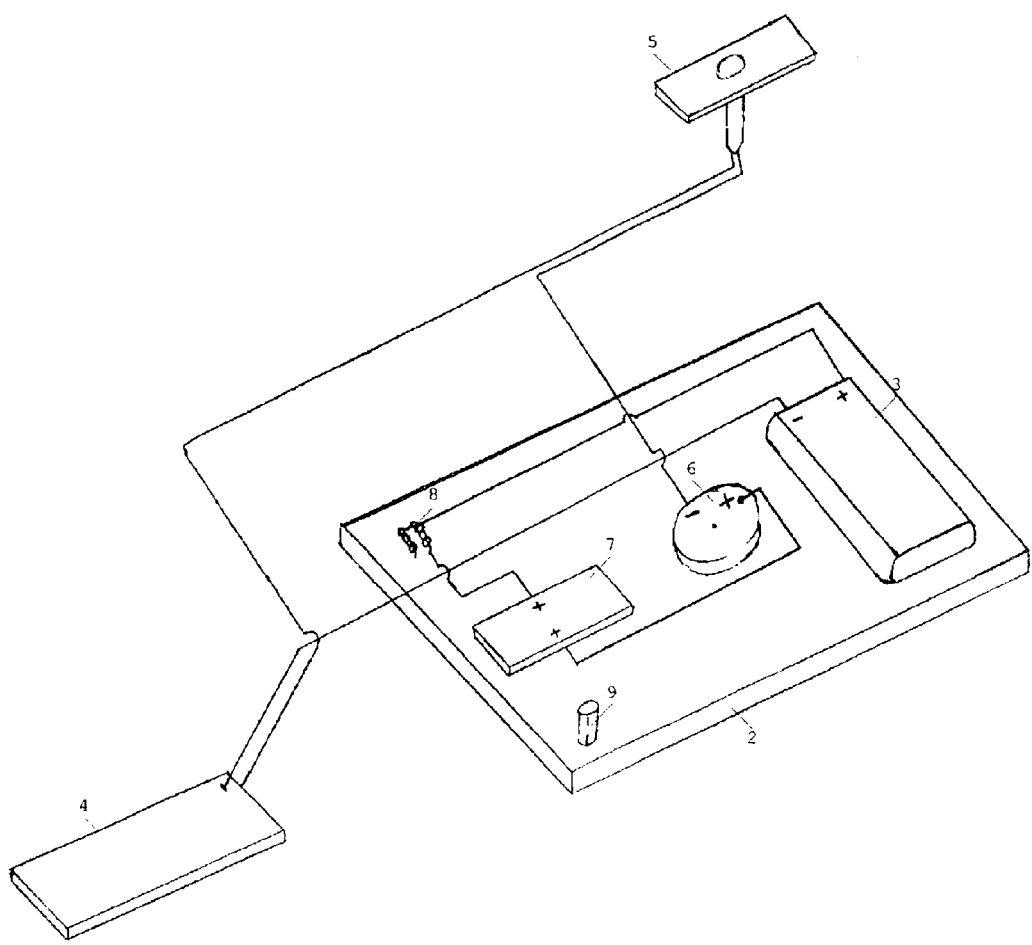
FIG. 1 is a perspective view of a portable infant reminder system in accordance with the invention.

FIG. 1 is a perspective view of the portable infant reminder circuit in accordance with the invention including a circuit board 2 that attaches to the side of any infant seat with adhesive backed Velcro and a 9 volt battery 3 mounted to it which provides power to the circuit and by connecting this 9 volt battery's ground lead to the pressure switch 4 when a child is present in the infant seat and the pressure switch 4 has been placed at the bottom of the infant seat under the seat's fabric cover it will make a mechanical connection and send ground to the photo cell light detector 5 that is attached to the exterior of the vehicle's dome light lens with adhesive backed Velcro. When the photo cell light detector 5 detects the vehicles dome light has gone from an "off" state to an "on" state caused by the exiting driver opening his door the photo cell light detector 5 will then close like a switch and if a child is present in the infant seat it will send ground to the Buzzer 6 creating an audible warning. The positive lead from the 9 volt battery 3 is connected to a 47 k ohm resistor 8 which determines the on/off audible duration length during alarm generation and is connected to the positive number three pin of the 555 timer 7 which cycles the positive current flowing to the positive side of the Buzzer 6 to which it is connected on and off. Finally there is a 100 uf capacitor 9 mounted on the circuit board 2 to smooth out any voltage spikes within the circuit.

In operation, the infant seat is placed within a vehicle and a child is placed within the infant seat for transport within the vehicle. The pressure switch 4 supplies ground to the photo cell light detector 5 indicating that the infant seat is occupied. Upon reaching the desired destination, the driver will open his door to exit the vehicle. At this point the photo cell light detector 5 having sensed the dome light is "on" as a result of the driver opening his door to exit the vehicle will now send a ground signal to the buzzer 6 generating an audible alarm. The 9 volt battery 3 removably mounted on the circuit board 2 provides power to this buzzer 6 but voltage is only drawn during alarm generation so the battery will last a very long time.

It will be apparent to one of ordinary skill in the art that the various components discussed above can be incorporated into either the infant seat or the vehicle into which the infant seat is to be placed. All of the components of the system may be provided as part of the vehicle structure instead of located in the infant seat. Accordingly, the invention can be vehicle based, seat based or a combination of both. Our prototype testers prefer the portable version as it easily travels form vehicle to vehicle with the car seat.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A warning system for detecting presence of a child in an infant seat for reminding the driver to remove the child from the infant car seat when exiting the vehicle, comprising:

means for providing a base for components to be connected;

means for providing voltage to circuit, removably connected to said means for providing a base for components to be connected;

means for detecting the presence of an occupant within the infant seat, electrically connected to said means for providing voltage to circuit;

means for detecting the "on" or "off" state of the vehicles dome light, electrically connected to said means for detecting the presence of an occupant within the infant seat;

means for generating an audible alarm in response to the alarm signal, electrically connected to said means for detecting the "on" or "off" state of the vehicles dome light, and rigidly connected to said means for providing a base for components to be connected;

means for providing a 7 second on and a 3 second off duration for the audible alarm cycle, rigidly connected to said means for generating an audible alarm in response to the alarm signal, and rigidly connected to said means for providing a base for components to be connected;

means for determining the on off duration length during alarm generation, rigidly connected to said means for providing a 7 second on and a 3 second off duration for the audible alarm cycle, rigidly connected to said means for providing voltage to circuit, and rigidly connected to said means for providing a base for components to be connected; and means for smoothing out any voltage spikes within the circuit, rigidly connected to said means for providing a base for components to be connected.

2. The warning system for detecting presence of a child in an infant seat in accordance with claim 1, wherein said means for providing a base for components to be connected comprises a circuit board.

3. The warning system for detecting presence of a child in an infant seat in accordance with claim 1, wherein said means for providing voltage to circuit comprises a 9 volt battery.

4. The warning system for detecting presence of a child in an infant seat in accordance with claim 1, wherein said means for detecting the presence of an occupant within the infant seat comprises a pressure switch.

5. The warning system for detecting presence of a child in an infant seat in accordance with claim 1, wherein said means for detecting the "on" or "off" state of the vehicles dome light comprises a photo cell light detector.

6. The warning system for detecting presence of a child in an infant seat in accordance with claim 1, wherein said means for generating an audible alarm in response to the alarm signal comprises a buzzer.

7. The warning system for detecting presence of a child in an infant seat in accordance with claim 1, wherein said means for providing a 7 second on and a 3 second off duration for the audible alarm cycle comprises a 555 timer.

8. The warning system for detecting presence of a child in an infant seat in accordance with claim 1, wherein said means for determining the on off duration length during alarm generation comprises a 47 k ohm resistor.

9. The warning system for detecting presence of a child in an infant seat in accordance with claim 1, wherein said means for smoothing out any voltage spikes within the circuit comprises a 100 uf capacitor.

10. A warning system for detecting presence of a child in an infant seat for reminding the driver to remove the child from the infant car seat when exiting the vehicle, comprising:

a circuit board, for providing a base for components to be connected;

a 9 volt battery, for providing voltage to circuit, removably connected to said circuit board;

a pressure switch, for detecting the presence of an occupant within the infant seat, electrically connected to said 9 volt battery;

a photo cell light detector, for detecting the "on" or "off" state of the vehicles dome light, electrically connected to said pressure switch;

a buzzer, for generating an audible alarm in response to the alarm signal, electrically connected to said photo cell light detector, and rigidly connected to said circuit board;

a 555 timer, for providing a 7 second on and a 3 second off duration for the audible alarm cycle, rigidly connected to said Buzzer, and rigidly connected to said circuit board;

a 47 k ohm resistor, for determining the on off duration length during alarm generation, rigidly connected to said 555 timer, rigidly connected to said 9 volt battery, and rigidly connected to said circuit board; and a 100 uf capacitor, for smoothing out any voltage spikes within the circuit, rigidly connected to said circuit board.

* * * * *